Oct. 1, 1957     E. E. WISHAW     2,808,200

SEPARATOR

Filed March 7, 1955

INVENTOR
EDGAR E. WISHAW

BY

ATTORNEYS

United States Patent Office 2,808,200
Patented Oct. 1, 1957

2,808,200

SEPARATOR

Edgar E. Wishaw, Racine, Wis.

Application March 7, 1955, Serial No. 492,615

1 Claim. (Cl. 233—14)

This invention appertains to the separation of solid matter from liquids and more particularly to a novel device for purifying liquids by removing insoluble substances therefrom.

One of the primary objects of my invention is to provide a simple, yet durable, device for continuously purifying liquids comprising a closed bowl having an inlet at its upper end for the liquid to be purified and an outlet at its lower end for the purified liquid, the bowl being adapted to be rotated at a high rate of speed, whereby insoluble matter in the liquid will be impinged against the inner face of the bowl.

Another salient object of my invention is the provision of a partition plate located in the bowl for rotation therewith, having its peripheral edge spaced from but in close proximity to the side wall of the bowl, whereby the liquid will be directed in an even flow toward the side wall of the bowl and in an even film thereover to facilitate the directing of the insoluble matter toward the bowl and thus insure the clinging of all insoluble matter to the inner surface of the bowl.

A further important object of my invention is the provision of a rapidly rotating bowl having a turbulence chamber in its upper end for receiving a liquid inlet of a less diameter than the chamber, the bowl having an outlet at its lower end of greater diameter than the inlet but of slightly less diameter than the chamber, whereby to cause a slight back pressure in the chamber, so that any turbulence created by the incoming liquid will take place in the chamber, and thus insure a smooth flow of liquid under its own weight toward and over the partition.

A still further important object of my invention is to provide a controlled flow vortex within the bowl and to provide means whereby the bowl can be easily and quickly cleaned when necessary.

Figure 1:
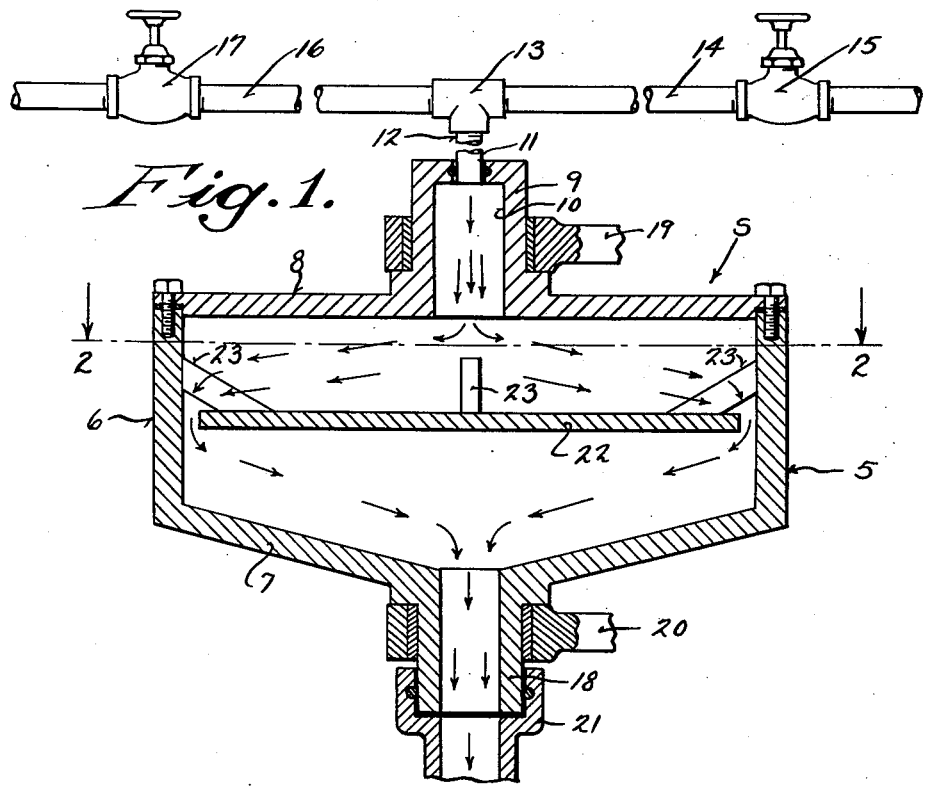
Figure 2:
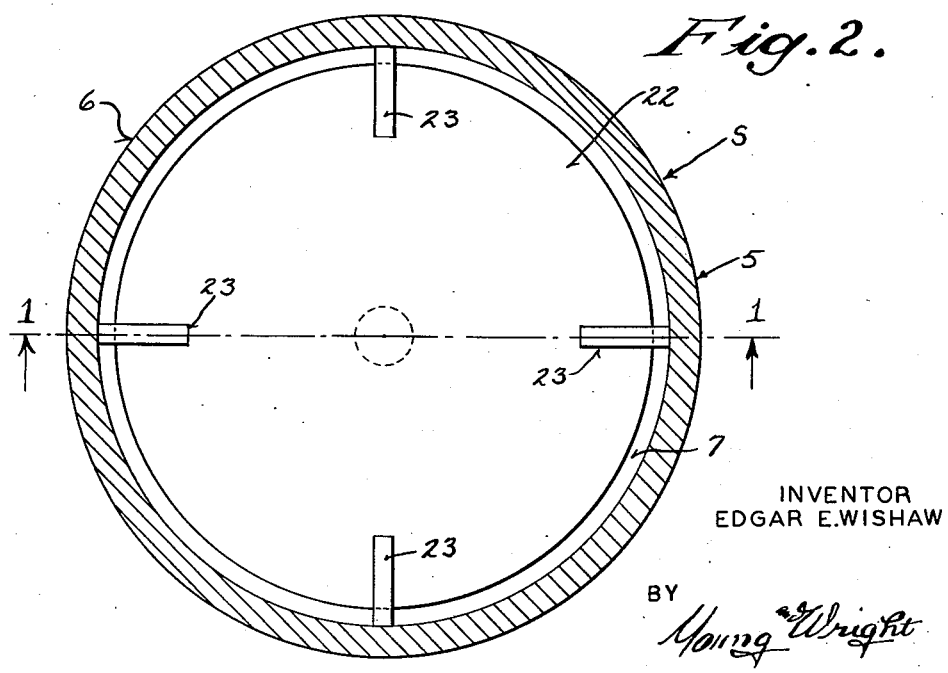

With these and other objects in view, the invention consists in the novel construction, formation and arrangement of parts, as will be hereinafter more specifically described and claimed, and illustrated in the accompanying drawing, in which drawing, Figure 1 is a central vertical sectional view through my separator taken on the line 1—1 of Figure 2, looking in the direction of the arrows, and Figure 2 is a horizontal sectional view through the separator taken on the line 2—2 of Figure 1, looking in the direction of the arrows.

Referring to the drawing in detail, wherein similar reference characters designate corresponding parts throughout the several views, the letter S generally indicates my improved separator and the same includes a bowl 5 or the like, in which the liquid to be treated is introduced. The bowl 5 includes an annular side wall 6 and a curved bottom wall 7 giving a concave inner surface, as shown. The bowl is closed by an upper plate 8. Formed on the cover plate 8 at its axial center is a vertically disposed hollow inlet boss 9 and formed within the boss is a chamber 10 having communication at its lower end with the upper end of the bowl. The boss has formed therein an inlet opening 11 and communicating with this opening is an inlet pipe 12 for the liquid to be treated. The inlet pipe 12 preferably communicates with the lower leg of a T-coupling 13. The T-coupling has connected therewith a pipe 14 for the liquid to be cleaned and the flow of liquid through this pipe is controlled by a manually operated valve 15. Also communicating with the T-coupling 13 is a pipe 16 for flushing water, the purpose of which will later appear, and flow of water through the pipe 16 is controlled by a manually operated valve 17.

Formed on the axial center of the bottom wall 7 is a depending sleeve 18 and this sleeve forms the outlet for the treated liquid. The boss 9 and the sleeve 18 form a means for permitting the suspension of the bowl for rotation and upper and lower bearing brackets 19 and 20 are provided respectively for the boss 9 and the sleeve 18. The sleeve 18 fits within a catch basin 21 for receiving the treated liquid from the bowl.

Arranged within the bowl 5 is a disc shaped partition plate 22 and this partition plate is suspended within the bowl in any desired way for rotation therewith, such as the use of supporting arms 23. The arms can be welded, or otherwise fastened to the plate 22 and the inner face of the side wall 6 of the bowl. The peripheral edge of the partition plate is spaced from the inner face of the side wall but in close proximity thereto for a purpose, which will also be more fully set forth.

The bowl is rapidly rotated, say at 2000 revolutions per minute through any desired means, and if desired a drive belt (not shown) is placed around the periphery of the bowl and the belt can then be driven from a drive pulley.

In use of my improved separator, the valve 17 is closed and the valve 15 is open to permit the flow of liquid to be treated at the desired volume into the chamber 10, and the liquid will flow into the chamber and thus into the bowl and over the partition plate 22. The partition plate directs the liquid in a thin film over the inner surface of the side wall 6 of the bowl and due to the high rate of speed of the bowl insoluble matter will cling to the inner surface of the bowl and the treated liquid will flow out of the bowl through the sleeve 18 into the catch basin 21.

It is to be noted that the inlet 11 is of considerably less diameter than the interior diameter of the chamber 10, and that the interior diameter of the sleeve 18 is of greater diameter than the inlet but of a slightly less diameter than the chamber 10. This creates a slight back pressure within the bowl and any turbulence caused by the flow of incoming liquid will take place in the chamber 10 and hence the liquid flows into the bowl evenly and is directed by the partition 22 toward the side of the bowl. As the liquid moves past the side wall of the bowl in a comparatively thin film any solid matter contained in the liquid must of necessity flow past the inner surface of the side wall of the bowl and will be directed toward such surface and will cling to the surface due to centrifugal force.

The efficiency and speed of treating liquid can be varied according to the nature of the liquid being treated by increasing or decreasing the speed of rotation of the bowl, increasing or decreasing the diameter and height of the bowl and by controlling the rate of flow of liquid (by manipulating the valve 15) into the bowl.

When it is desired to clean the bowl, the valve 15 is closed and the rotation of the bowl is stopped. The valve 17 is now opened to permit flushing water to enter the bowl and wash all foreign matter out of the same. During the cleaning of the bowl the flushing water can, of course, be directed to a different place than the liquid that has been treated.

The separator has many uses, such as water purification, sewage purification etc. The separator can also be effectively used for removing sediment from oil, pulp from fruit juices and the like.

Changes in details may be made without departing from the spirit or the scope of this invention, but what I claim as new is:

A device for removing insoluble matter from liquids comprising a bowl adapted to be rotated at a high rate of speed, said bowl including an annular side wall, a curved bottom wall having an inner concave surface and a top wall, an axially disposed boss carried by the top wall having an interior chamber communicating with the upper end of the bowl, an axially disposed sleeve carried by and depending from the bottom wall, said chamber having an inlet at its upper end of less diameter than the chamber, the interior diameter of the sleeve being greater than the interior diameter of the inlet but slightly less than the interior diameter of the chamber, means for introducing liquid to be treated into the chamber through the inlet, and a partition plate disposed within the bowl for rotation therewith having its peripheral edge spaced from the inner surface of the side wall but in close proximity thereto.

References Cited in the file of this patent

UNITED STATES PATENTS

| | | |
|---|---|---|
| 1,004,760 | Fetzer | Oct. 3, 1911 |
| 1,101,548 | Hoffman | June 30, 1914 |
| 2,519,971 | Le Clair | Aug. 22, 1950 |

FOREIGN PATENTS

| | | |
|---|---|---|
| 399,713 | France | Apr. 29, 1909 |